US012472610B2

(12) United States Patent
Leathrum et al.

(10) Patent No.: US 12,472,610 B2
(45) Date of Patent: Nov. 18, 2025

(54) POWERED FASTENER DRIVER

(71) Applicant: MILWAUKEE ELECTRIC TOOL CORPORATION, Brookfield, WI (US)

(72) Inventors: Travis W. Leathrum, Milwaukee, WI (US); Troy C. Thorson, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/493,927

(22) Filed: Oct. 25, 2023

(65) Prior Publication Data

US 2024/0131675 A1 Apr. 25, 2024
US 2024/0227147 A9 Jul. 11, 2024

Related U.S. Application Data

(60) Provisional application No. 63/419,072, filed on Oct. 25, 2022.

(51) Int. Cl.
*B25C 1/06* (2006.01)
*B25C 1/04* (2006.01)

(52) U.S. Cl.
CPC ................ *B25C 1/047* (2013.01); *B25C 1/06* (2013.01)

(58) Field of Classification Search
None
See application file for complete search history.

(56) References Cited

U.S. PATENT DOCUMENTS 5,720,423 A 2/1998 Kondo et al.
7,237,515 B2 7/2007 Nishikawa et al.
7,387,092 B2 6/2008 Nishikawa et al.
10,730,172 B2 8/2020 Po
10,843,318 B2 11/2020 Kobori et al.
10,875,166 B2 12/2020 Ueda
10,946,506 B1 3/2021 Ueda
11,273,545 B2 3/2022 Ueda
11,338,421 B2 5/2022 Po
(Continued)

FOREIGN PATENT DOCUMENTS

WO 2016174995 A1 11/2016
WO 2021195188 A1 9/2021

OTHER PUBLICATIONS

Extended European Search Report for Application No. 23205416.3 dated Mar. 28, 2024 (11 pages).

*Primary Examiner* — Chinyere J Rushing-Tucker

(74) *Attorney, Agent, or Firm* — Michael Best & Friedrich LLP

(57) ABSTRACT

A powered fastener driver including a housing, an inner cylinder within the housing, and a piston movable within the inner cylinder from a TDC position to a BDC position. The piston has a diameter of less than 1.7 inches. A stroke length of the piston is between the TDC position and the BDC position measuring greater than 3 inches. A driver blade is attached to the piston for movement therewith along a driving axis. A lifter is operable to move the piston and driver blade from the BDC position toward the TDC position. A drive unit is operably coupled to the lifter to provide torque thereto, causing the lifter to rotate. A source of pressurized gas is in fluid communication with the inner cylinder. A pressure of the pressurized gas acting on the piston at the TDC position is greater than 180 psi.

20 Claims, 11 Drawing Sheets

(56) References Cited

U.S. PATENT DOCUMENTS

| | | | | |
|---|---|---|---|---|
| 2010/0243286 | A1 | 9/2010 | Hoshino et al. | |
| 2020/0114500 | A1* | 4/2020 | Bierdeman | B25C 1/047 |
| 2020/0331132 | A1 | 10/2020 | Po | |
| 2021/0031348 | A1 | 2/2021 | Kobori et al. | |
| 2021/0197352 | A1 | 7/2021 | Ueda | |
| 2021/0237242 | A1* | 8/2021 | Carrier | B25C 1/047 |
| 2021/0245345 | A1 | 8/2021 | Ueda et al. | |
| 2021/0308849 | A1 | 10/2021 | Ruecklinger | |

* cited by examiner

POWERED FASTENER DRIVER

CROSS-REFERENCE TO RELATED APPLICATIONS

This application claims priority to U.S. Provisional Patent Application No. 63/419,072, filed on Oct. 25, 2022, the entire content of which is incorporated by reference herein.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

The present invention provides, in one aspect, a powered fastener driver including a housing, an inner cylinder within the housing, and a piston movable within the inner cylinder from a top-dead-center (TDC) position to a driven or bottom-dead-center (BDC) position. The piston has a diameter of less than 1.7 inches. A stroke length of the piston is between the TDC position and the BDC position measuring greater than 3 inches. A driver blade is attached to the piston for movement therewith along a driving axis from the TDC position toward the BDC position for driving a fastener into a workpiece. A lifter is operable to move the piston and driver blade from the BDC position toward the TDC position. A drive unit is operably coupled to the lifter to provide torque thereto, causing the lifter to rotate. A source of pressurized gas is in fluid communication with the inner cylinder. A pressure of the pressurized gas acting on the piston at the TDC position is greater than 180 psi.

The present invention provides, in another aspect, a powered fastener driver including housing and an inner cylinder within the housing. The inner cylinder includes a first end, a second end opposite the first end, and an engagement interface on an outer surface thereof. The engagement interface is positioned between the first end and the second end of the inner cylinder. A piston is movable within the inner cylinder from a top-dead-center (TDC) position to a driven or bottom-dead-center (BDC) position and the piston has a diameter of less than 1.7 inches. A stroke length of the piston between the TDC position and the BDC position measuring greater than 3 inches. A driver blade is attached to the piston for movement therewith along a driving axis from the TDC position toward the BDC position for driving a fastener into a workpiece. A lifter is operable to move the piston and driver blade from the BDC position toward the TDC position. A drive unit is operably coupled to the lifter to provide torque thereto, causing the lifter to rotate. A storage chamber cylinder is positioned within the housing and including a pressurized gas in fluid communication with the inner cylinder. The storage chamber cylinder includes a first end and a second end opposite the first end. The second end has an inner surface with an engagement interface. The first end of the inner cylinder is positioned within the storage chamber cylinder and the second end of the inner cylinder is spaced apart from the second end of the storage chamber cylinder. The inner cylinder is coupled to the storage chamber cylinder via the mating engagement between the engagement interface of the inner cylinder and the engagement interface of the storage chamber cylinder. A seal ring is between the outer surface of the inner cylinder and the inner surface of the storage chamber cylinder at a location between the engaged engagement interfaces and the second end of the storage chamber cylinder. A pressure of the pressurized gas acting on the piston at the TDC position is greater than 180 psi.

The present invention provides, in another aspect, a powered fastener driver including a housing, an inner cylinder within the housing and having a first end, a second end opposite the first end, and a piston movable within the inner cylinder from a top-dead-center (TDC) position to a driven or bottom-dead-center (BDC) position. The piston has a diameter of less than 1.7 inches and a stroke length of the piston between the TDC position and the BDC position measuring greater than 3 inches. The fastener driver further includes a driver blade attached to the piston for movement therewith along a driving axis from the TDC position toward the BDC position for driving a fastener into a workpiece, a lifter operable to move the piston and driver blade from the BDC position toward the TDC position, a drive unit operably coupled to the lifter to provide torque thereto, causing the lifter to rotate, and a storage chamber cylinder positioned within the housing. The storage chamber cylinder includes a pressurized gas in fluid communication with the inner cylinder and an annular wall that extends between a first end and a second end opposite the first end. The annular wall gradually tapers radially inward from the first end to the second end. The inner cylinder is positioned within the storage chamber cylinder and the second end of the inner cylinder contacts the annular wall of the storage chamber cylinder at an engagement interface. A pressure of the pressurized gas acting on the piston at the TDC position is greater than 180 psi.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 2:
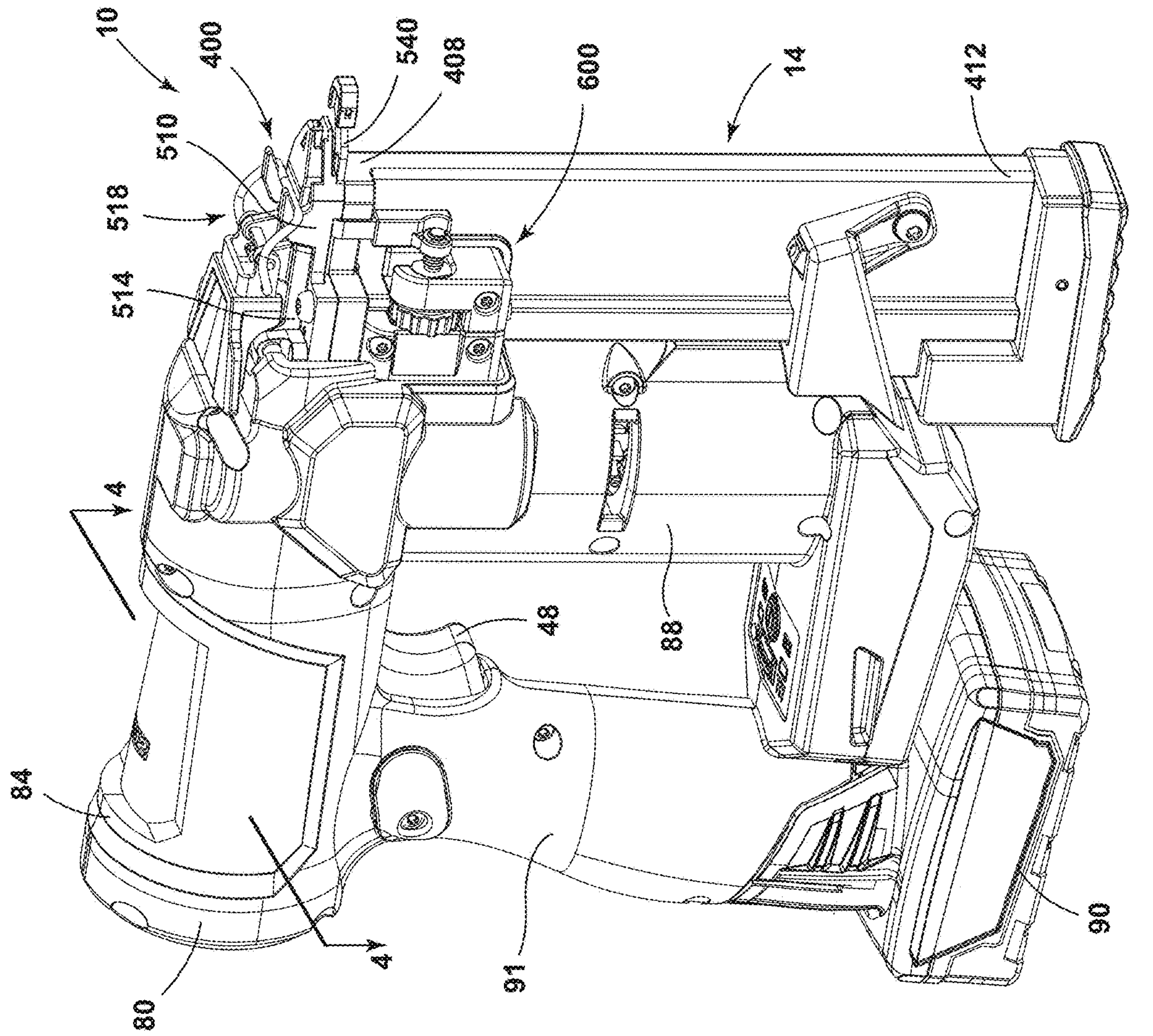
FIG. 2 is another perspective view of the gas spring-powered fastener driver of FIG. 1.
Figure 3:
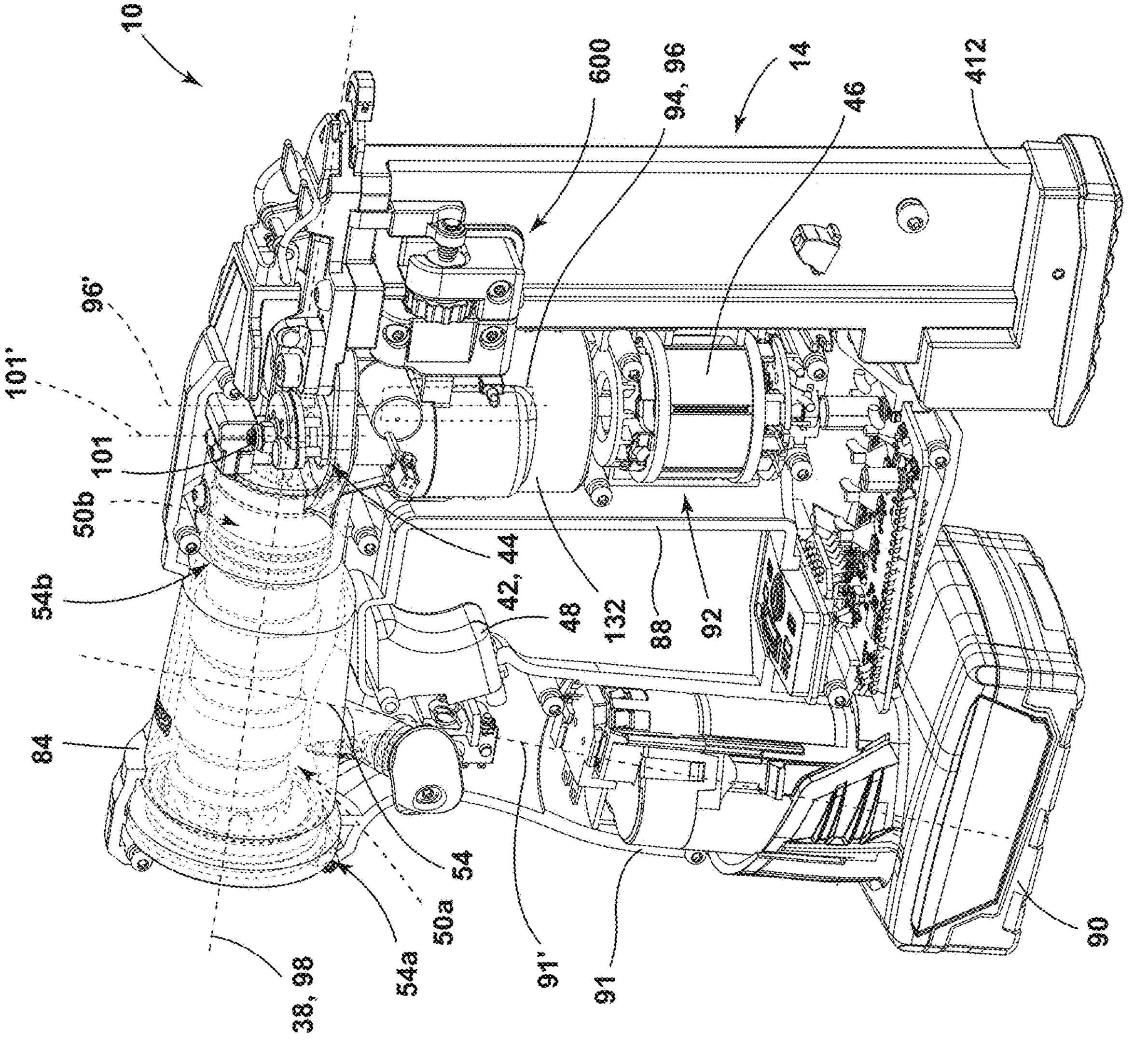
FIG. 3 is a partial cut-away view of the gas spring-powered fastener driver of FIG. 1, with portions removed for clarity.
Figure 4:
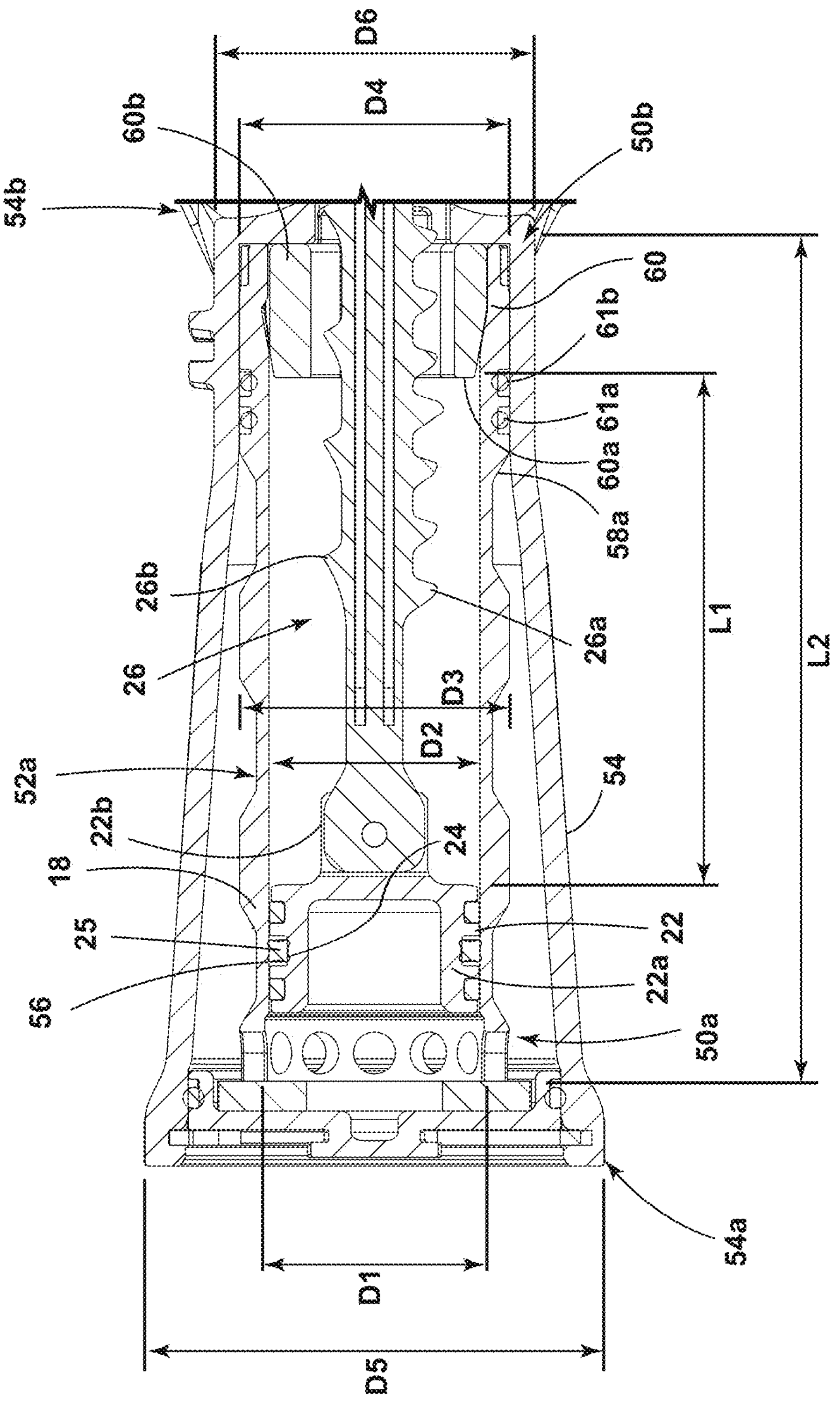
FIG. 4 is a cross-sectional view of the gas spring-powered fastener driver of FIG. 1 along line 4-4 of FIG. 2, which shows among other features, the storage chamber cylinder, the cylinder, the piston in a first position, the driver blade, and the bumper.

With reference to FIGS. 1-4, a gas spring-powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the inner cylinder 18 (FIG. 4). The fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the inner cylinder 18. In the illustrated embodiment, the inner cylinder 18 and the moveable piston 22 are positioned within the storage chamber cylinder 30. The driver 10 further includes a fill valve coupled to the storage chamber cylinder 30. When connected with a source of compressed gas, the fill valve permits the storage chamber cylinder 30 to be refilled with compressed gas if any prior leakage has occurred. The fill valve may be configured as a Schrader valve, for example. As shown in FIG. 4 and discussed below, the driver blade 26 has a body, lifting teeth **26*a* extending from one side of the body, and latching teeth 26*b*** extending from an opposite side of the body.

Figure 10:
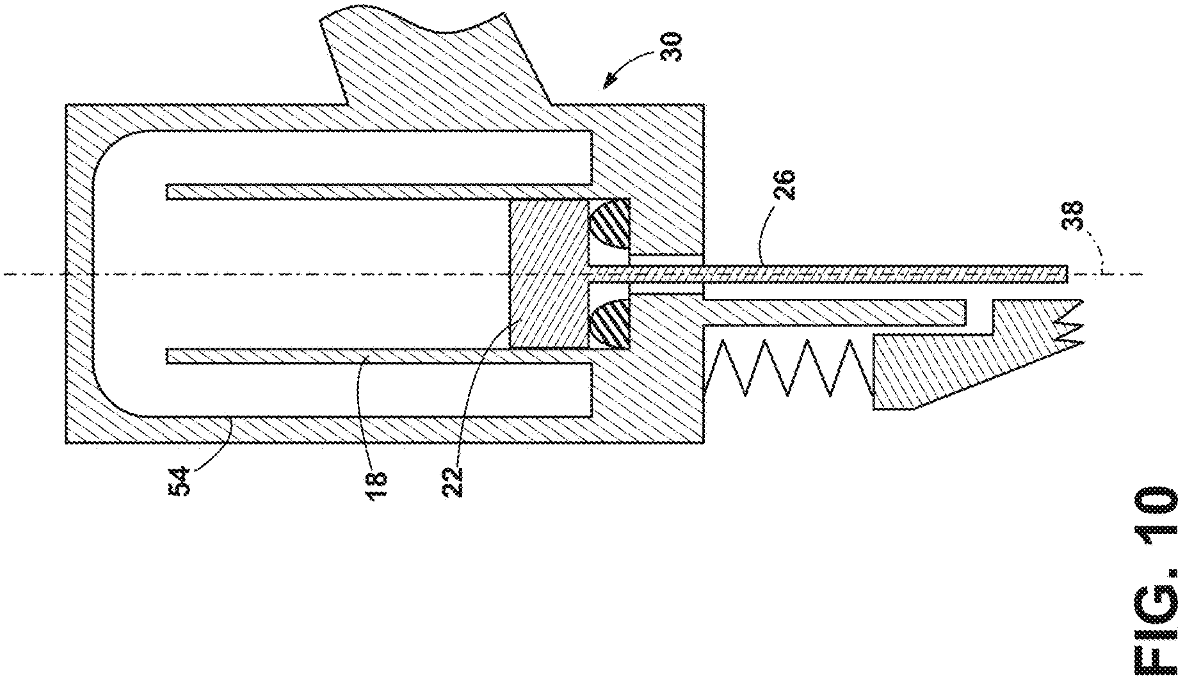
FIG. 10 is a schematic view of the gas spring-powered fastener driver of FIGS. 1 and 5, illustrating a driver blade in a driven or bottom-dead-center position.

With continued reference to FIGS. 1-4, the inner cylinder 18 and the driver blade 26 define a driving axis 38. During a driving cycle, the driver blade 26 and piston 22 are moveable between a top-dead-center (TDC) position (FIG. 11B) and a driven or bottom-dead-center (BDC) position (FIG. 10A). The fastener driver 10 further includes a lifting assembly 42 (FIG. 3), which has a lifter 44 that is powered by a motor 46 and that moves the driver blade 26 from the BDC position to the TDC position.

Figure 1:
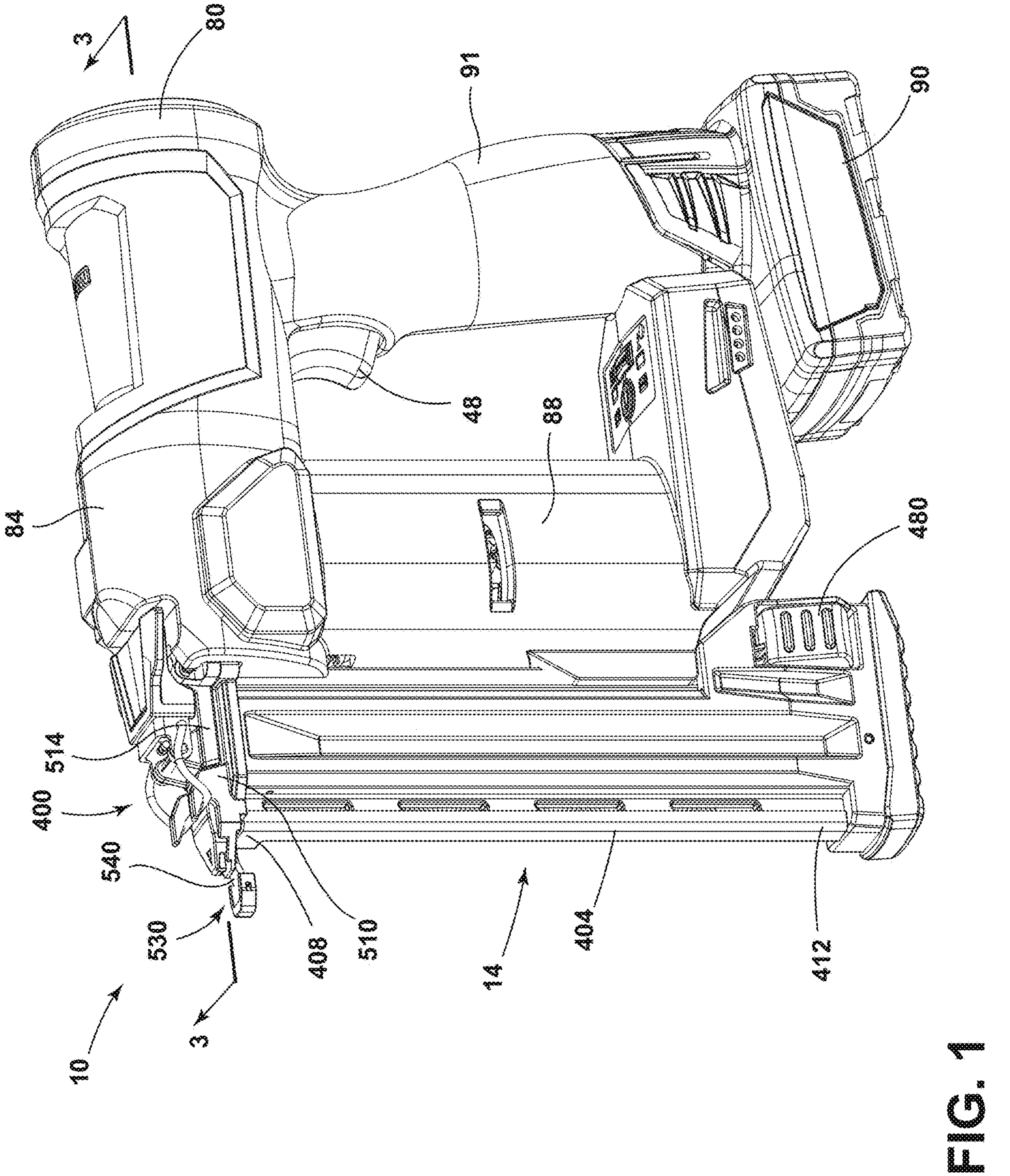
FIG. 1 is a perspective view of a gas spring-powered fastener driver including a magazine and a workpiece contact assembly in accordance with an embodiment of the invention.

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC and the BDC positions, until being released by user activation of a trigger 48 (FIG. 1). When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifting assembly 42 and the piston 22 to further compress the gas within the inner cylinder 18 and the storage chamber cylinder 30.

With respect to FIG. 4, in the illustrated embodiment, the piston 22 includes a first portion **22*a* and a second portion 22*b* that is integrally formed with or otherwise coupled to the first portion 22*a*. The first portion 22*a* defines a groove 24 (e.g., a circumferential groove) that extends about a circumference thereof. In the illustrated embodiment, the second portion 22*b* is integrally formed with the first portion 22*a*. In some embodiments, the second portion 22*b* may be coupled to the first portion 22*a* via threaded engagement or via a fastener. The second portion 22*b* is coupled to the driver blade 26. In the illustrated embodiment, the driver blade 26 is coupled to the piston 22 via a fastener (e.g., a pin), but in other embodiments, the driver blade 26 may be coupled to the piston 22** via a threaded engagement.

In the illustrated embodiment, the piston 22 includes a smaller diameter compared to pistons in other gas spring-powered fastener drivers. The first portion **22*a* defines a maximum diameter D1 of the piston 22. A diameter of the second portion 22*b* is generally less than the diameter of the first portion 22*a*, in the illustrated embodiment. Due to the reduced size of the piston 22 (e.g., the first portion 22*a* thereof), the pressure of the compressed gas necessary to move the piston 22 and driver blade 26** from the TDC position to the BDC position with sufficient force to adequately drive a nail into a workpiece increases.

In the illustrated embodiments, the maximum diameter D1 measures less than or equal to approximately 1.5 inches (e.g., 38.1 mm). Thus, a total surface area of the piston 22 is less than or equal to approximately 1.77 inches$^2$ (e.g., 1140 mm$^2$). When the piston 22 has a diameter of less than or equal to 1.5 inches and a total surface area exposed to the compressed gas in the inner cylinder 18 of less than or equal to approximately 1.77 inches$^2$, the pressure of the compressed gas necessary to move the piston 22 and the driver blade 26 from the TDC position to the BDC position with sufficient force to adequately drive the nail into the workpiece is at least 236 psi, which is greater than the pressure of conventional gas spring drivers when the piston is at the TDC position. The term approximately as used herein means plus or minus 5% of the stated value.

Further with respect to FIG. 4, the inner cylinder 18 is configured to guide the piston 22 and the driver blade 26 along the driving axis 38 to compress the gas in the storage chamber cylinder 30. The inner cylinder 18 is therefore sized and shaped according to the size and shape of the piston 22. The inner cylinder 18 includes a first end 50*a* and a second end 50*b* that is opposite the first end 50*a*. A length L2 of the inner cylinder 18 is defined between the first end 50*a* and the second end 50*b*. The length L2 is approximately 6.36 inches (e.g., 161.65 mm). In other embodiments, the length L2 is between approximately 5.5 inches (e.g., 140 mm) and approximately 7 inches (e.g., 178 mm). The inner cylinder 18 defines a substantially uniform inner diameter D2 between he first end 50*a* and the second end 50*b*. In the illustrated embodiment, the cylindrical portion 52*a* of the inner cylinder 18 defines an inner diameter D2 of approximately 1.5 inches (e.g., 38.1 mm). The inner cylinder 18 further defines an outer diameter D3 of approximately 1.58 inches (e.g., 44.1 mm). At the second end 50*b*, the inner cylinder 18 defines an outer diameter D4 of approximately 1.97 inches (e.g., 50 mm). The piston 22 is positioned adjacent the first end 50*a* in the TDC position and the piston 22 is positioned adjacent the second end 50*b* in the BDC position.

Figure 9:
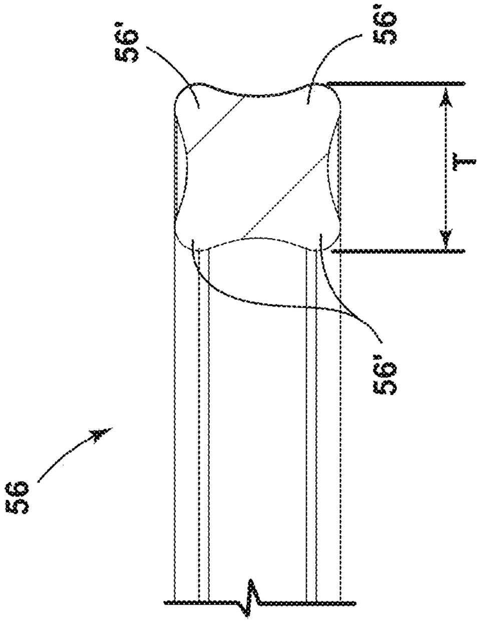
FIG. 9 is a cross-sectional view of the seal ring of FIG. 8.
Figure 8:
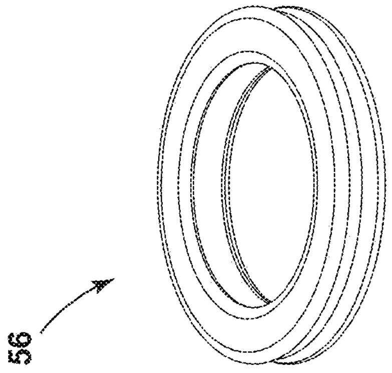
FIG. 8 is a perspective view of a seal ring used with the piston of FIGS. 1-7.

With continued reference to FIG. 4, the groove 24 of the first portion 22*a* receives a seal ring 56 therein, which seals the piston 22 relative to the inner cylinder 18. As shown in FIGS. 8 and 9, the seal ring 56 is configured as a "quad ring". When configured as a quad ring, the seal ring 56 includes a cross-sectional shape having four lobes 56' (FIG. 9), with adjacent lobes 56' being equidistantly spaced. In other embodiments, the seal ring 56 may be an O-ring having a conventional cylindrical cross-section. Regardless of whether the seal ring 56 is a quad ring or an O-ring, the seal ring 56 is made from an elastomer or plastic material having a material composition to reduce friction with the inner wall of the inner cylinder 18 during sliding contact therewith. The seal ring 56 preferably has a thickness T of greater than 0.2 inches (greater than 5 mm). The thickness T of the seal ring 56 helps to reduce permeation that results from the increased internal pressure.

With continued reference to FIG. 4, the storage chamber cylinder 30 surrounds the inner cylinder 18. The storage chamber cylinder 30 includes an annular outer wall 54 circumferentially surrounding the inner cylinder 18. The annular outer wall 54 includes a first end 54*a* and a second end 54*b* opposite the first end 54*a*. The first end 54*a* includes a first diameter D5 and the second end 54*b* includes a second diameter D6 that is smaller than the first diameter D5. The first diameter D5 at the first end 54*a* is approximately 2.87 inches (i.e., 73 mm), while the second diameter D6 at the second end 54*b* is approximately 2.30 inches (i.e., 58.5 mm). The inner cylinder 18 is disposed between the first end 54*a* and the second end 54*b* of the storage chamber cylinder 30. In some embodiments, the inner cylinder 18 may be coupled to the storage chamber cylinder 30 via a threaded engagement.

Figure 5:
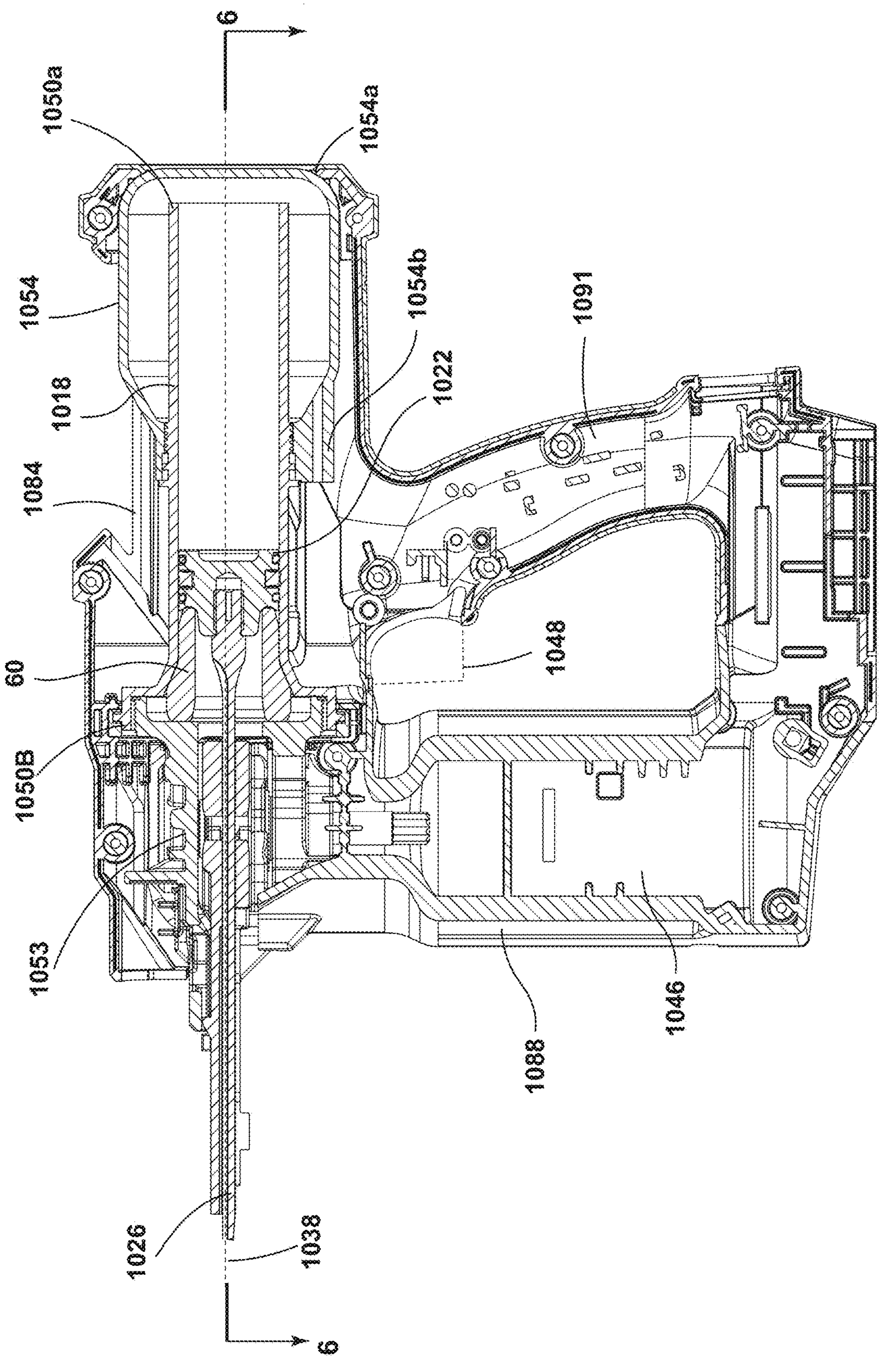
FIG. 5 is a cross-sectional view of a gas spring-powered fastener driver in accordance with another embodiment, which shows, among other features, a storage chamber cylinder, a cylinder, a piston in a second position, a driver blade, and a bumper.
Figure 6:
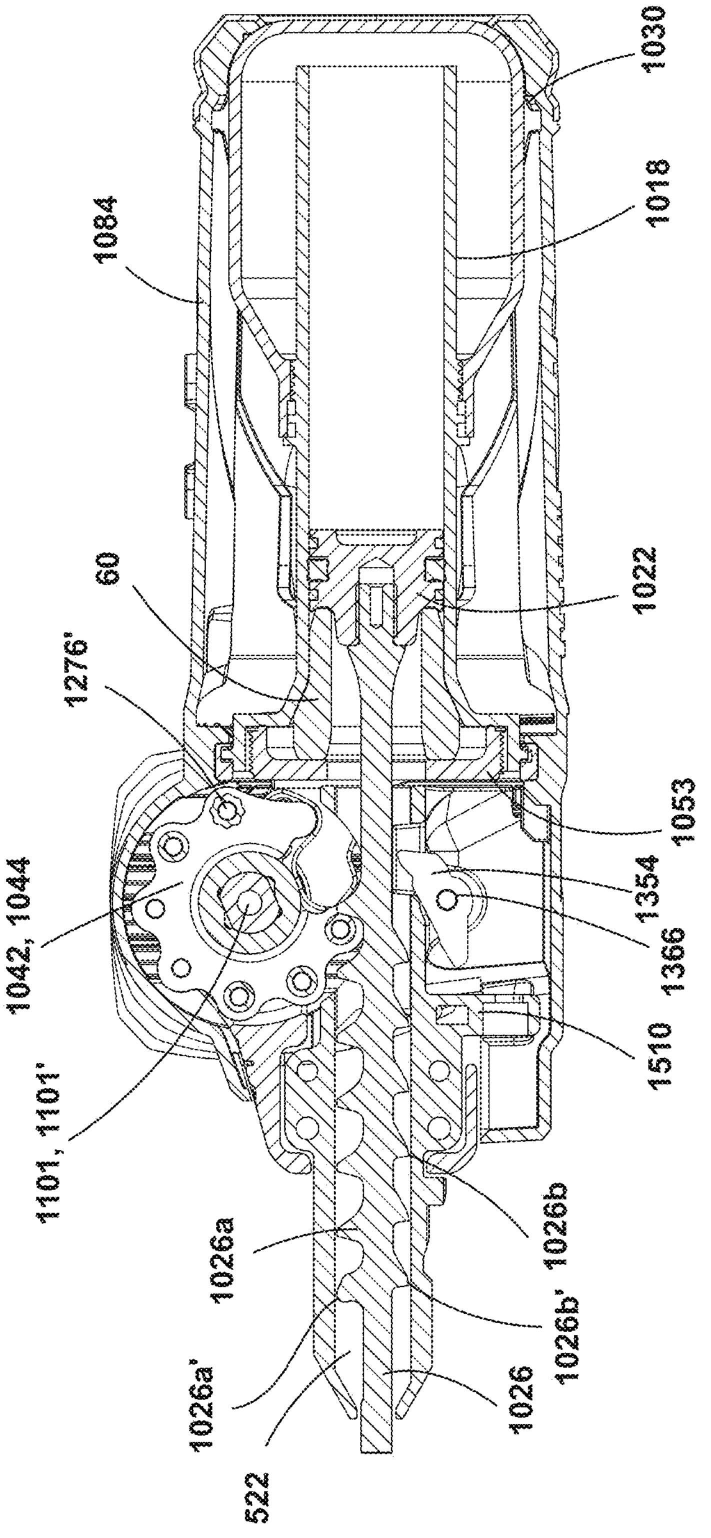
FIG. 6 is a cross-sectional view of the gas spring-powered fastener driver along line 6-6 shown in FIG. 5, which shows, among other features, the storage chamber cylinder, the cylinder, the piston in the second position, the driver blade, and the bumper.
Figure 7:
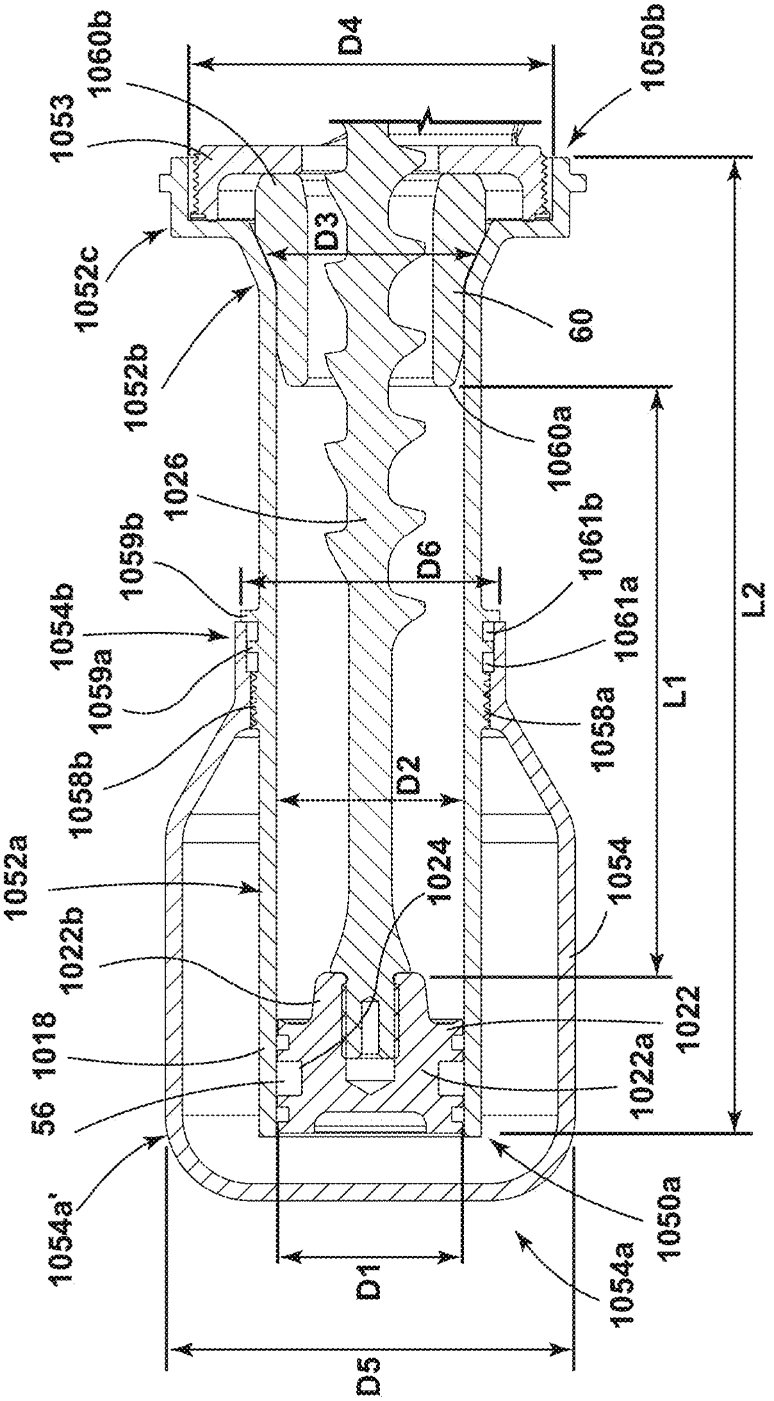
FIG. 7 is an enlarged cross-sectional view of the gas spring-powered fastener driver of FIG. 6 with the housing removed and showing the piston in the first position.

FIGS. 5-7 illustrate a gas spring-powered fastener driver 1010 in accordance with another embodiment of the invention. The fastener driver 1010 is similar to the fastener driver 10, with like reference numerals plus "1000".

The fastener driver 1010 is operable to drive fasteners (e.g., nails, tacks, staples, etc.) and includes an inner cylinder 1018 and a moveable piston 1022 positioned within the inner cylinder 1018 (FIG. 5). The fastener driver 1010 further includes a driver blade 1026 that is attached to the piston 1022 and moveable therewith. The fastener driver 1010 does not require an external source of air pressure, but rather includes an outer storage chamber cylinder 1030 of pressurized gas in fluid communication with the inner cylinder 1018. In the illustrated embodiment, the inner cylinder 1018 and the moveable piston 1022 are positioned within the storage chamber cylinder 1030. The driver 1010 further includes a fill valve coupled to the storage chamber cylinder 1030. As shown in FIG. 7 and discussed below, the driver blade 1026 has a body, lifting teeth 1026*a* extending from one side of the body, and latching teeth 1026*b* extending from an opposite side of the body. The inner cylinder 1018 and the driver blade 1026 define a driving axis 1038. A motor 1046 moves the driver blade 1026 from the BDC position to the TDC position. The fastener driver 1010 operates on a gas spring principle utilizing the lifting assembly 1042 and the piston 1022 to compress the gas within the inner cylinder 1018 and the storage chamber cylinder 1030.

With respect to FIGS. 6 and 7, in the illustrated embodiment, the piston 1022 includes a first portion 1022*a* and a second portion 1022*b* that is integrally formed with or otherwise coupled to the first portion 1022*a*. The first portion 1022*a* defines a groove 1024 (e.g., a circumferential groove) that extends about a circumference thereof. In the illustrated embodiment, the second portion 1022*b* is integrally formed with the first portion 1022*a*. In some embodiments, the second portion 1022*b* may be coupled to the first portion 1022*a* via threaded engagement or via a fastener. The second portion 1022*b* is coupled to the driver blade 1026. In the illustrated embodiment, the driver blade 1026 is coupled to the piston 1022 via a threaded engagement.

In the illustrated embodiment, the piston 1022 includes a smaller diameter compared to pistons in other gas spring-powered fastener drivers. The first portion 1022*a* defines a maximum diameter D1 of the piston 1022. A diameter of the second portion 1022*b* is generally less than the diameter of the first portion 1022*a*, in the illustrated embodiment. Due to the reduced size of the piston 1022 (e.g., the first portion 22*a* thereof), the pressure of the compressed gas necessary to move the piston 1022 and driver blade 1026 from the TDC position to the BDC position with sufficient force to adequately drive a nail into a workpiece increases.

In the illustrated embodiments, the maximum diameter D1 measures less than approximately 1.73 inches (e.g., 44 mm). Thus, a total surface area of the piston 1022 is less than approximately 2.35 inches$^2$ (e.g., 1520 mm$^2$). When the piston 1022 has a diameter of less than 1.73 inches and a total surface area exposed to the compressed gas in the inner cylinder 1018 of less than approximately 2.35 inches$^2$, the pressure of the compressed gas necessary to move the piston 1022 and the driver blade 1026 from the TDC position to the BDC position with sufficient force to adequately drive the nail into the workpiece is at least 174 psi, which is greater than the pressure of conventional gas spring drivers when the piston is at the TDC position. When the piston 1022 has a diameter of less than 1.7 inches (e.g., 43.2 mm) and a total surface area of less than approximately 2.27 inches$^2$ (e.g., 1465 mm$^2$), the pressure of the compressed gas necessary to move the piston 1022 and the driver blade 1026 from the TDC position to the BDC position with sufficient force to adequately drive the nail into the workpiece is at least 180 psi. In some embodiments, the piston 1022 may have a diameter that measures approximately 1.7 inches (correlating to a total surface area of 2.27 inches$^2$) to approximately 1.2 inches (e.g., 30.5 mm, which correlates to a total surface area of 1.13 inches$^2$ and 730 mm$^2$, respectively) in which case the pressure of the compressed gas necessary to move the piston 1022 and the driver blade 1026 from the TDC position to the BDC position with sufficient force to adequately drive the nail into the workpiece is between at least 180 psi and at least 360 psi. In some embodiments, the piston 1022 may have a diameter that measures approximately 1.5 inches (e.g., 38.1 mm, which correlates to a total surface area of 1.77 inches$^2$ and 1140 mm$^2$, respectively) to approximately 1.25 inches (e.g., 31.8 mm, which correlates to a total surface area of 1.23 inches$^2$ and 794 mm$^2$, respectively) in which case the pressure of the compressed gas necessary to move the piston 1022 and the driver blade 1026 from the TDC position to the BDC position with sufficient force to adequately drive the nail into the workpiece is between at least 333 psi and at least 231 psi. In one embodiment, the piston 1022 has a maximum diameter D1 of approximately 1.3 inches (e.g., 33 mm) and defines a total surface area of approximately 1.32 inches$^2$ (e.g., 858 mm$^2$) in which case the pressure of the compressed gas necessary to move the piston 1022 and the driver blade 1026 from the TDC position to the BDC position with sufficient force to adequately drive the nail into the workpiece is at least 308 psi. In another embodiment, the piston 1022 has a maximum diameter D1 of approximately 1.3 inches and defines a surface area of approximately 1.32 inches$^2$ in which case the pressure of the compressed gas necessary to move the piston 1022 and the driver blade 1026 from the TDC position to the BDC position with sufficient force to adequately drive the nail into the workpiece is at least 308 psi to at least 345 psi. The term approximately as used herein means plus or minus 5% of the stated value.

Further with respect to FIG. 7, the inner cylinder 1018 is configured to guide the piston 1022 and the driver blade 1026 along the driving axis 1038 to compress the gas in the storage chamber cylinder 1030. The inner cylinder 1018 is therefore sized and shaped according to the size and shape of the piston 1022. The inner cylinder 1018 includes a first end 1050*a* and a second end 1050*b* that is opposite the first end 1050*a*. A length L2 of the inner cylinder 1018 is defined between the first end 1050*a* and the second end 1050*b*. The length L2 is approximately 6.7 inches (e.g., 170 mm). In other embodiments, the length L2 is between approximately 5.5 inches (e.g., 140 mm) and approximately 7 inches (e.g., 178 mm). The inner cylinder 1018 defines a first cylindrical portion 1052*a*, a second frusto-conical portion 1052*b*, and a third cylindrical portion 1052*c*. The cylindrical portion 1052*a* extends from the first end 1050*a* to the frusto-conical portion 1052*b*, the frusto-conical portion 1052*b* extends from the cylindrical portion 1052*a* to the cylindrical portion 1052*c*, and the cylindrical portion 1052*c* extends from the frusto-conical portion 1052*b* to the second end 1050*b*. The cylindrical portion 1052*a* defines a substantially uniform inner diameter D2, the frusto-conical portion 1052*b* defines an inner diameter D3 that increases from the cylindrical portion 1052*a* to the cylindrical portion 1052*c*, and the cylindrical portion 1052*c* defines a substantially uniform inner diameter D4. In the illustrated embodiment, the cylindrical portion 1052*a* of the inner cylinder 1018 defines an inner diameter D2 of approximately 1.2 inches (e.g., 30 mm) to approximately 1.7 inches (e.g., 44 mm). Preferably, the cylindrical portion 1052*a* of the inner cylinder 1018 defines an inner diameter D2 of less than approximately 1.3 inches (e.g., 33 mm). In the illustrated embodiment, the cylindrical portion 1052*c* of the inner cylinder 1018 defines an inner diameter D4 of approximately 1.7 inches (e.g., 43 mm) to approximately 2.4 inches (e.g., 60 mm). Preferably, the cylindrical portion 1052*c* of the inner cylinder 1018 defines an inner diameter D4 of less than approximately 2 inches (e.g., 50 mm). An inner diameter D3 of the frusto-conical portion 1052*b* gradually increases from the cylindrical portion 1052*a* to the frusto-conical portion 1052*b*. The second end 1050*b* is closed by a portion of an inner frame 1053, which supports the lifter 1044. The piston 1022 is positioned adjacent the first end 1050*a* in the TDC position and the piston 1022 is positioned between the first end 1050*a* and the second end 1050*b* in the BDC position.

With continued reference to FIG. 7, the groove 1024 of the first portion 1022*a* receives a seal ring 56 therein, which seals the piston 1022 relative to the inner cylinder 1018. The inner cylinder 1018 further includes an engagement interface 1058*a* extending circumferentially about an outer surface thereof. The engagement interface 1058*a* is positioned between the first end 1050*a* and the second end 1050*b*. In the illustrated embodiment, the engagement interface 1058*a* is positioned at a generally central location between the first end 1050*a* and the second end 1050*b*. Moreover, the engagement surface 1058*a* is located at approximately 0.5 L2 in the illustrated embodiment. In other embodiments, the engagement surface 1058*a* may be located at approximately 0.4 L2 and approximately 0.6 L2 as measured from the first end 1050*a*. In the illustrated embodiment, the engagement interface 1058*a* is a threaded interface. Additionally, a first circumferential flange 1059*a* and a second circumferential flange 1059*b* extend from the outer surface of the inner cylinder 18, as well. The first flange 59*a* is positioned between the engagement interface 1058*a* and the second flange 1059*b*, and the second flange 1059*b* is positioned between the first flange 1059*a* and the second end 1050*b*. The second flange 1059*b* has a greater diameter than a diameter of the first flange 1059*a*.

With reference to FIGS. 5-7, the storage chamber cylinder 1030 surrounds the inner cylinder 1018. The storage chamber cylinder 1030 includes an annular outer wall 1054 circumferentially surrounding the inner cylinder 1018. The annular outer wall 1054 includes a first end 1054*a* and a second end 1054*b* opposite the first end 1054*a*. The first end 1054*a* includes a first diameter D5 and the second end 1054*b* includes a second diameter D6 that is smaller than the first diameter D5. In the illustrated embodiment, the first end 1054*a* has a circumferential rounded edge 1054*a*'. The second end 1054*b* includes an inner surface with an engagement interface 1058*b*. In the illustrated embodiment, the engagement interface 1058*b* is a threaded interface.

Figure 15:
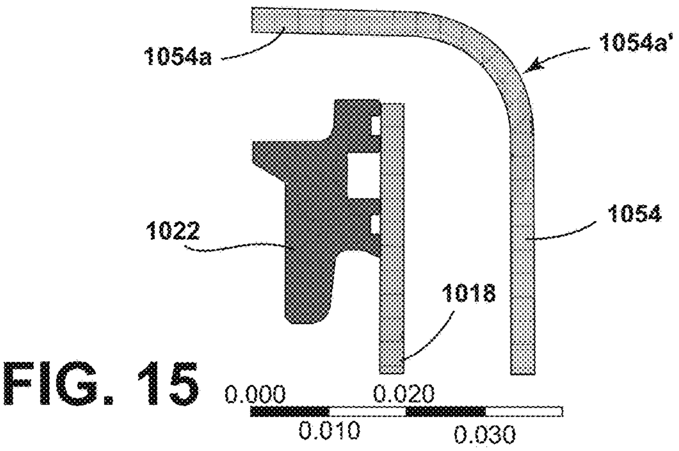
FIG. 15 is a schematic view of a portion of the storage chamber cylinder according to one embodiment.
Figure 16:
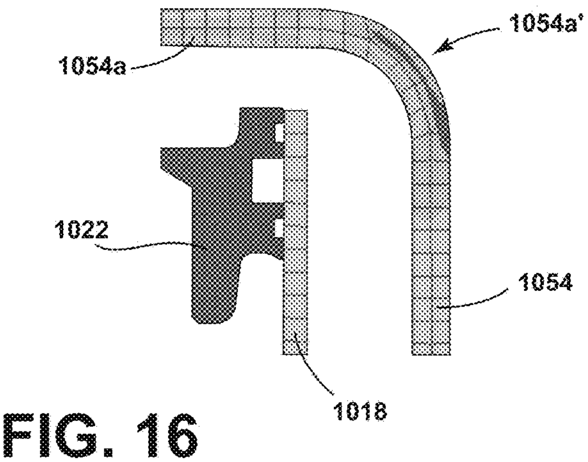
FIG. 16 is a schematic view of a portion of the storage chamber cylinder according to another embodiment.
Figure 17:
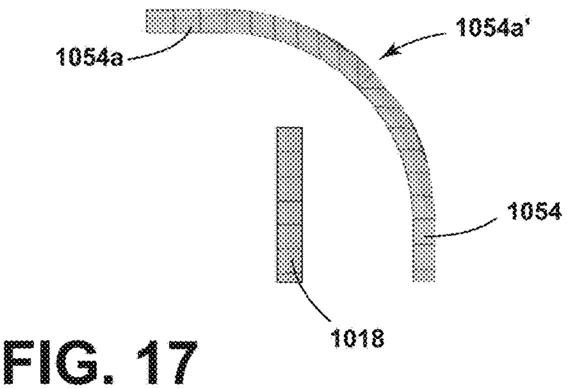
FIG. 17 is a schematic view of a portion of the storage chamber cylinder according to another embodiment.
Figure 18:
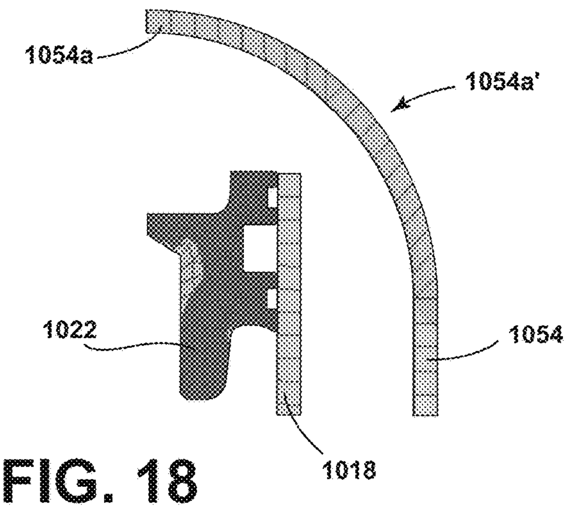
FIG. 18 is a schematic view of a portion of the storage chamber cylinder according to another embodiment.
Figure 19:
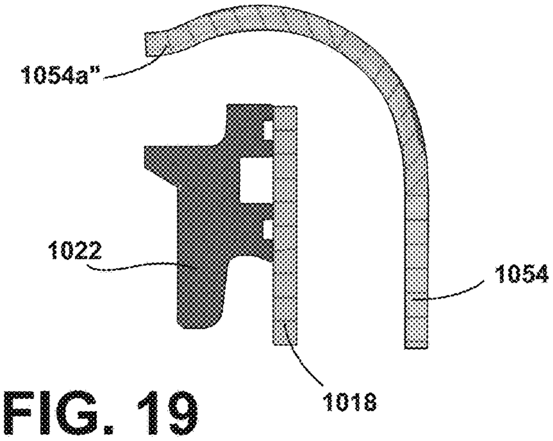
FIG. 19 is a schematic view of a portion of the storage chamber cylinder according to another embodiment.

In the illustrated embodiment (FIG. 15), the rounded circumferential edge 1054*a*' is defined by a radius of 0.4 inches (e.g., 10 mm). The larger radius of the rounded circumferential edge 1054*a*' helps to counteract the higher internal pressure. In other embodiments, the rounded circumferential edge 1054*a*' may be defined by a radius of 0.9 inches (e.g., 20 mm) as shown in FIG. 17 or 1.3 inches (e.g., 33 mm) as shown in FIG. 18, for example. In still other embodiments, the rounded circumferential edge 1054*a*' may be defined by a radius that ranges from 0.2 inches to 1.4 inches (e.g., 5 mm to 35 mm). In still other alternative or additional embodiments, the first end 1054*a* may further include a recessed outer surface 1054*a*" (FIG. 19). The recessed outer surface 1054*a*" may define a divot in the first end 1054. Finally, in yet other alternative or additional embodiments, the annular outer wall 1054 may have a thickness of 5 mm (FIG. 16), such that the thickness of the annular outer wall 1054 is 67% thicker than annular outer walls of conventional drivers. As shown in FIGS. 15 and 16 and Table 1 (below), when the rounded circumferential edge 1054*a*' of the storage chamber cylinder 1030 has radius of 0.4 inches (e.g., 10 mm) or 0.9 inches (e.g., 20 mm), stress on the annular outer wall 1054 due to the increased internal pressure is decreased more than thicker walls without adding weight.

TABLE 1

| FIG. | Description | Max Equivalent Stress (MPa) |
|---|---|---|
| FIG. 15 | 10 mm Radius | 395 |
| FIG. 16 | 67% Thicker Walls | 241 |
| FIG. 17 | 20 mm Radius | 280 |
| FIG. 18 | 33 mm Radius | 169 |
| FIG. 19 | Divot Back Wall | 350 |

The inner cylinder 1018 is axially and rotationally secured relative to the annular outer wall 1054. Also, the inner cylinder 1018 extends outwardly from the annular outer wall 1054, as shown in FIG. 7. In particular, the first end 1050*a* is positioned within the storage chamber cylinder 1030 and the second end 1050*b* is spaced part from the storage chamber cylinder 1030 (e.g., the second end 1054*b* of the annular wall 1054). With respect to FIG. 7, the engagement interface 1058*b* of the annular outer wall 1054 is configured to matingly seal with (e.g., threadably engage) the engagement interface 1058*a* on an outer surface of the inner cylinder 1018. In other embodiments, the engagement interfaces 1058*a*, 1058*b* may have other mating, sealing engagement interfaces (e.g., a snap fit engagement or a detent engagement). The sealing (e.g., the threaded engagement) between the inner cylinder 1018 and the storage chamber cylinder 1030 helps to accommodate the higher internal pressure. Moreover, the first flange 1059*a* is positioned within the annular outer wall 1054 and the second flange 1059*b* is positioned outside the annular outer wall 1054. As shown, the second flange 1059*b* abuts the second end 1054*b* of the annular outer wall 1054. Moreover, a first seal ring 1061*a* and a second seal 1061*b* are positioned between the outer surface of the inner cylinder 1018 and the annular outer wall 1054. As shown, the first seal ring 1061*a* is positioned between the engagement interfaces 1058*a*, 1058*b* and the first flange 1059*a* and the second seal ring 1061*b* is positioned between the first flange 1059*a* and the second flange 1059*b*. In the illustrated embodiment, the first seal ring 1061*a* and the second seal 1061*b* have a generally cuboidal cross-section. The first and second seal rings 1061*a*, 1061*b* help to reduce permeation that results from the increased internal pressure. Due to the increased pressure within an annular space between the inner cylinder 1018 and storage chamber cylinder 1030, the sealing therebetween needs to be made tighter. The combination of the sealing engagement surfaces 1058*a*, 1058*b*, the seals 1061, 1061*b*, and the flanges 1059*a*, 1059*b* helps to accomplish a tighter sealing between the inner cylinder 1018 and storage chamber cylinder 1030.

Figure 12:
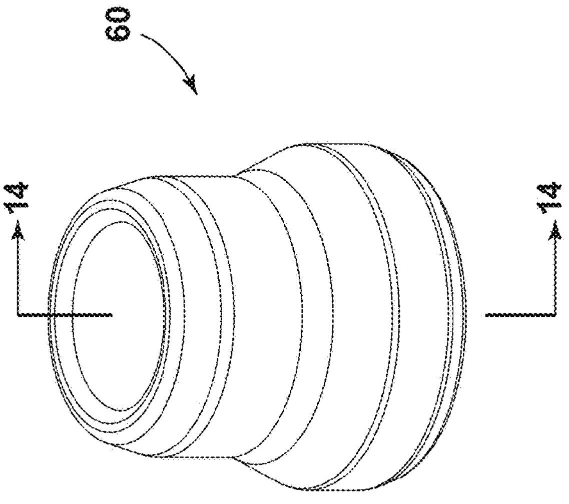
FIG. 12 is a perspective view of the bumper of FIGS. 1-7, according to one embodiment.
Figure 13:
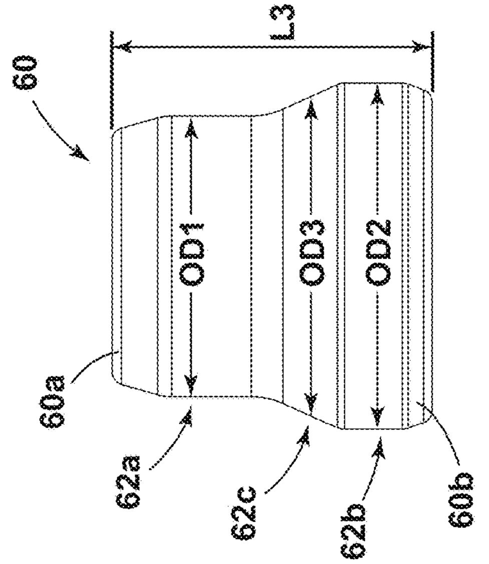
FIG. 13 is a side view of the bumper of FIG. 12.
Figure 14:
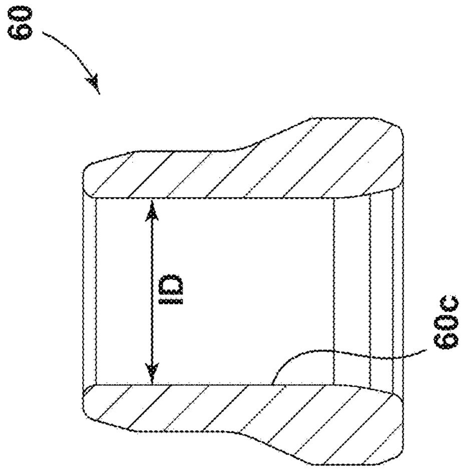
FIG. 14 is a cross-sectional view of the bumper along the line 14-14 of FIG. 12.

With reference to FIGS. 12-14, the driver 10, 1010 includes a bumper 60 positioned beneath the piston 22 for stopping the piston 22 at the driven or BDC position (FIG. 10*f*) and absorbing the impact energy from the piston 22. The bumper 60 is configured to distribute the impact force of the piston 22 uniformly throughout the bumper 60 as the piston 22 is rapidly decelerated upon reaching the BDC position. The bumper 60 may be formed from any suitable elastic material (e.g., rubber).

As shown in FIGS. 12-14, in the illustrated embodiments, the bumper 60 includes a first end 60*a* and a second end 60*b* that is opposite the first end 60*a*. A length L3 of the bumper is defined between the first end 60*a* and the second end 60*b*. The length L3 is greater than approximately 1.0 inches (e.g., 25 mm). In other embodiments, the length L3 is between approximately 1 inch (e.g., 25 mm) and approximately 2 inches (e.g., 50 mm). In one embodiment embodiments, the length L3 may be approximately 1.5 inches (e.g., 38 mm). The bumper 60 also includes an aperture 60*c* extending therethrough between the first 60*a* and the second end 60*b*. The aperture 60*c* defines an inner diameter ID. The bumper 60 also has an outer diameter. The inner diameter ID is substantially uniform, while the outer diameter is variable along the length of the bumper 60. The inner diameter ID is approximately 0.9 inches (e.g., 22 mm). In other embodiments, the inner diameter ID may measure approximately 0.7 inches (e.g., 18 mm) to 1 inch (e.g., 26 mm). The bumper 60 defines a first portion 62*a*, a second portion 62*b*, and a neck portion 62*c* between the first portion 62*a* and the second portion 62*b*. The first portion 62*a* extends from the first end 60*a* to the neck portion 62*c*, and the second portion 62*b* extends from the second end 60*b* to the neck portion 62*c*. In the illustrated embodiment, an outer diameter OD1 of the first portion 62*a* is approximately 1.3 inches (e.g., 33 mm). In other embodiments, the outer diameter OD1 of the first portion 62*a* may be approximately 1.2 inches (e.g., 30 mm) to 1.7 inches (e.g., 44 mm). In the illustrated embodiment, the thickness of the first portion 62*a* is approximately 0.2 inches (e.g., 5.5 mm). In the illustrated embodiment, the thickness of the first portion 62*a* may be approximately 0.1 inches (e.g., 3 mm) to approximately 0.3 inches (e.g., 8 mm). In the illustrated embodiment, the outer diameter OD2 of the second portion 62*b* is approximately 1.6 inches (e.g., 40 mm). In other embodiments, the outer diameter OD2 of the second portion 62*b* may be 1.3 inches (e.g., 34 mm) to 2 inches (e.g., 52 mm). An outer diameter OD3 of the neck portion 62*c* gradually increases from the first portion 62*a* to the second portion 62*b*.

As shown in at least FIGS. 4 and 7, the bumper 60 is positioned within the inner cylinder 18, 1018 and extends from the second end 50*b*, 1050*b* into the cylindrical portion 52*a*, 1052*a* of the inner cylinder 18*a*, 1018*a*. The bumper 60 is generally longer and thinner than conventional bumpers. In the illustrated embodiment, the length L3 of the bumper 60 is approximately 22% of the length L2 of the inner cylinder 18, 1018. In other embodiments, the length L3 of the bumper 60 may be greater than approximately 14% of the length L2 of the inner cylinder 18, 1018. In still other embodiments, the length L3 of the bumper 60 may be greater than approximately 20% of the length L2 of the inner cylinder 18, 1018. In still other embodiments, the length L3 of the bumper 60 may be between approximately 14% and approximately 40% of the length L2 of the inner cylinder 18, 1018. In still other embodiments, the length L3 of the bumper 60 may be between approximately 20% and approximately 30% of the length L2 of the inner cylinder 18, 1018. Moreover, the stroke length L1 is measured from the first end 50*a*, 1050*a* of the inner cylinder 18, 1018 to the first end 60*a* of the bumper 60 when the bumper 60 is compressed by impact of the piston 22, 1022. In the illustrated embodiment, the stroke length L1 of the piston 22 is greater than approximately 4.6 inches (e.g., 116.8 mm). The stroke length L1 is greater than approximately 70% of the length L2 of the inner cylinder 18, even with the increased length of the bumper 60. In other embodiments, the stroke length L1 of the piston 1022 is greater than approximately 3 inches (e.g., 76 mm), allowing the stroke length L1 to be greater than approximately 45% of the length L2 of the inner cylinder 18, even with the increased length of the bumper 60. Also, the inner cylinder 18, 1018 supports the bumper 60. The outer diameter of the storage chamber cylinder 30 where the bumper 30 is located is approximately 59 mm. In FIG. 7, the cylindrical portion 1052*a* of the inner cylinder 1018 supports the first portion 62*a* of the bumper 60, and frusto-conical portion 1052*b* supports the outer diameter OD2 of the neck portion 62*c*. The longer thinner bumper 60 in combination with the location of the bumper 60 relative to the inner cylinder 1018 distributes stress more effectively in an axial direction than a radial direction despite the increase in internal pressure due to the reduced size of the piston 1022. The longer thinner bumper 60 is also able to compress more to enable the sufficient stroke length L1.

With reference to FIGS. 1 and 2, the driver 10 includes a housing 80 having a cylinder support portion 84 in which the storage chamber cylinder 30 is at least partially positioned, a drive unit support portion 88 in which the motor 46 and a transmission 92 are at least partially positioned, and a handle portion 91, which defines a handle axis 91' that intersects the driving axis 38. In other words, the handle axis 91' is oriented in a plane 98 that bisects the driver 10 and extends through the driving axis 38 (FIG. 3). Additionally, in the illustrated embodiment, the cylinder support portion 84 extends between the drive unit support portion 88 and the handle portion 91. Accordingly, the drive unit support portion 88 and the handle portion 91 are spaced apart from one another. In the illustrated embodiment, the cylinder support portion 84, the drive unit support portion 88, and the handle portion 91 are integrally formed with one another as a single piece (e.g., using a casting or molding process, depending on the material used). As described below in further detail, the transmission 92 raises the driver blade 26 from the driven position to the ready position. With reference to FIG. 3, the motor 46 is positioned within the drive unit support portion 88 for providing torque to the transmission 92 when activated. A battery pack 90 is received and supported by a battery pack attachment interface of the handle portion 91. The battery pack 90 is electrically connectable to the motor 46 for supplying electrical power to the motor 46. In alternative embodiments, the driver may be powered from an alternative power source such as an AC voltage input (i.e., from a wall outlet), or by an alternative DC voltage input (e.g., an AC/DC converter).

With reference to FIG. 3, the transmission 92 provides torque to the lifter 44 from the motor 46. The transmission 92 includes an input shaft 94 and a first output shaft 96 extending along a first output shaft axis 96'. In the illustrated embodiment, the first output shaft axis 96' intersects the driving axis 38. In other words, like the handle axis 91' and the first output shaft axis 96' are contained within the plane 98 that bisects the driver 10 and also contains the driving axis 38. Accordingly, the motor 46 is in-line with the handle portion 91. Although not shown, the first output shaft 96 rotates a drive gear (not shown), which is operable to drive a driven gear (not shown). In the illustrated embodiment, the gears are meshed spur gears. Extending from the driven gear is a second output shaft 101 (FIG. 3). The second output shaft 101 is operable to drive the lifter 44, which in turn is operable to move the driver blade 26 from the driven position to the ready position, as explained in greater detail below. In the illustrated embodiment, the second output shaft 101 extends along a second output shaft axis 101' (FIG. 3) that is parallel to the first output shaft axis 96' and the plane 98. As shown, the second output shaft axis 101' is laterally offset from the driving axis 38 and the plane 98. Although not shown, the transmission 92 is configured as a planetary transmission having a first planetary gear stage (not shown) and a second planetary gear stage (not shown). In alternative embodiments, the transmission may be a single-stage planetary transmission, or a multi-stage planetary transmission including any number of planetary gear stages. Also, the driver 10 further includes a one-way clutch mechanism (not shown) incorporated in the transmission 92. The one-way clutch mechanism permits a transfer of torque to the first output shaft 96 of the transmission 92 in a single (i.e., first) rotational direction (i.e., counter-clockwise from the frame of reference of FIG. 3), yet prevents the motor 46 from being driven in a reverse direction in response to an application of torque on the first output shaft 96 of the transmission 92 in an opposite, second rotational direction (e.g., clockwise from the frame of reference of FIG. 3). In the illustrated embodiment, the one-way clutch mechanism is incorporated with the first planetary gear stage of the transmission 92. In alternative embodiments, the one-way clutch mechanism may be incorporated into the second planetary gear stage, for example. The driver 1010 further includes a first output shaft (not shown) and a second output shaft 1101 that extends along a second output shaft axis 1101'.

Although not shown, in some embodiments, the driver 10 further includes a torque-limiting electronic-clutch mechanism, which limits an amount of torque transferred to the first output shaft 96 and the lifter 44. The driver 1010 may also further include the torque-limiting electronic-clutch mechanism.

With reference to FIG. 6, in some embodiments, the driver 1010 further includes a latch assembly having a pawl or latch 1354 for selectively holding the driver blade 26 in the ready position, and a solenoid (not shown) for releasing the latch 1354 from the driver blade 1026. In other words, the latch assembly is moveable between a latched state in which the driver blade 1026 is held in the ready position against a biasing force (i.e., the pressurized gas in the storage chamber cylinder 1030), and a released state in which the driver blade 1026 is permitted to be driven by the biasing force from the ready position to the driven position. The latch 1354 is pivotably supported by a shaft (not shown) on the nosepiece base portion 1510 about a latch axis (which is into the page as shown in FIG. 6). The latch axis is parallel to the second output shaft axis 1101' of the second output shaft 1101. The driver 10 may also further include a latch assembly, as previously described.

With reference to FIG. 6, the latch assembly is positioned proximate the side of the driver blade 1026 that is opposite the lifting assembly 1042. Furthermore, the latch 1354 is configured to rotate, via actuation of the solenoid, about the shaft relative to the latch axis such that a tip of the latch 1354 is configured to engage a stop surface (not shown) of the nosepiece assembly 1400 when the latch 1354 is moved toward the driver blade 1026.

The latch 1354 is moveable between a latched position (coinciding with the latched state of the latch assembly) in which the latch 1354 is engaged with one of the teeth 1026*b* on the driver blade 1026 for holding the driver blade 1026 in the ready position against the biasing force of the compressed gas, and a released position (coinciding with the released state of the latch assembly) in which the driver blade 1026 is permitted to be driven by the biasing force of the compressed gas from the ready position to the driven position. Furthermore, the stop surface, against which the latch 1354 is engageable when the solenoid is de-energized, limits the extent to which the latch 1354 is rotatable in a counter-clockwise direction from the frame of reference of FIG. 6 about the latch axis 1366 upon return to the latched state.

Figure 11:
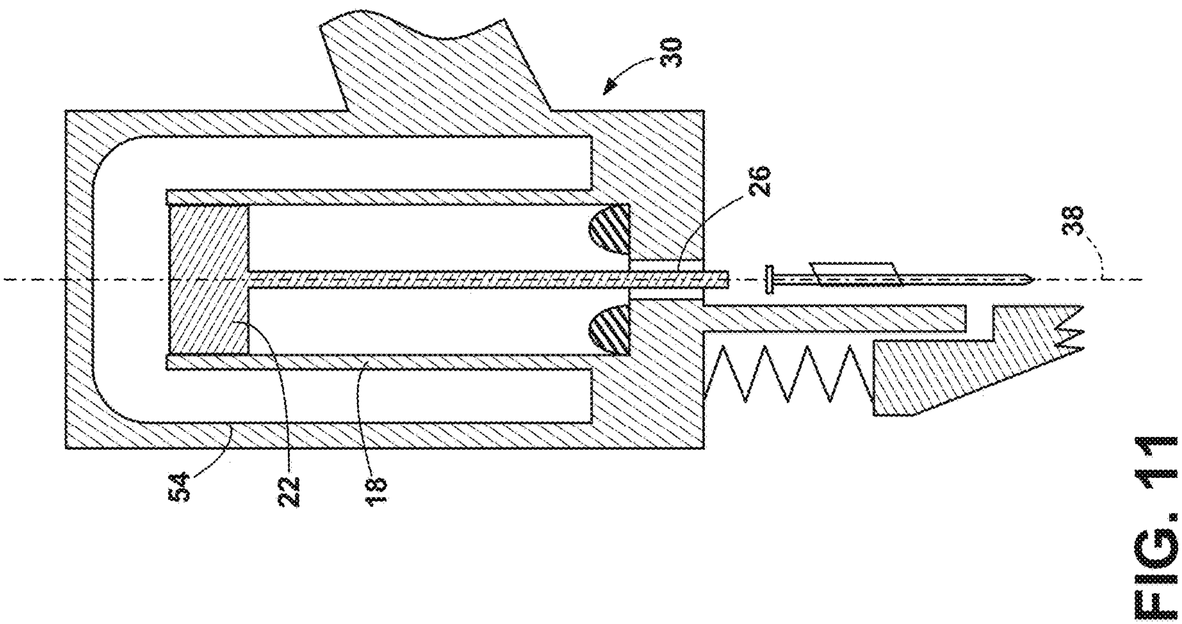
FIG. 11 is a schematic view of the gas spring-powered fastener driver of FIGS. 1 and 5, illustrating a driver blade in a top-dead-center position prior to actuation.

The operation of a firing cycle for the driver 10, 1010 is illustrated and detailed below. With reference to FIGS. 11B, prior to initiation a firing cycle, the driver blade 26, 1026 is held in the ready position with the piston 22, 1022 near top dead center within the inner cylinder 18, 1018. More specifically, a first drive pin 1276' (FIG. 6) on the lifter 44, 1044 is engaged with a lower-most tooth 26*a*', 1026*a*' (FIG. 5) of the axially spaced teeth lifting 26*a*, 1026*a* on the driver blade 26, 1026, and the rotational position of the lifter 44, 1044 is maintained by the one-way clutch mechanism. In other words, as previously described, the one-way clutch mechanism prevents the motor 46, 1046 from being back-driven by the transmission 92, 1092 when the lifter 44, 1044 is holding the driver blade 26, 1026 in the ready position. Also, in the ready position of the driver blade 26, 1026, the latch 1354 is engageable with a lower-most tooth 26*b*', 1026*b*' (FIG. 6) on the driver blade 26, though not necessarily in contact with and functioning to maintain the driver blade 26, 1026 in the ready position. Rather, the latch 1354 at this instant provides a safety function to prevent the driver blade 26, 1026 from inadvertently firing should the one-way clutch mechanism fail.

Upon the trigger 48, 1048 being pulled to initiate a firing cycle, the solenoid is energized to pivot the latch 1354 from the latched position to the release position, thereby repositioning the latch 1354 so that it is no longer engageable with the latching teeth 26*b*, 1026*b* (defining the released state of the latch assembly). At about the same time, the motor 46, 1046 is activated to rotate the first output shaft 96, 1096 and the lifter 44, 1044 in a counter-clockwise direction from the frame of reference of FIG. 6, thereby displacing the driver blade 26, 1026 upward past the ready position a slight amount before the lower-most tooth 26*a*', 1026*a*' on the driver blade 26, 1026 slips off the drive pin 1276' (at the TDC position of the driver blade 26, 1026). Thereafter, the piston 22, 1022 and the driver blade 26, 1026 are thrust downward toward the BDC position (FIG. 10A) by the expanding gas in the inner cylinder 18, 1018 and storage chamber cylinder 30, 1030. As the driver blade 26, 1026 is displaced toward the driven position, the motor 46, 1046 remains activated to continue counter-clockwise rotation of the lifter 44, 1044.

With reference to FIG. 6, in some embodiments, upon a fastener being driven into a workpiece, the piston 22, 1022 impacts the bumper 60 to quickly decelerate the piston 22, 1022 and the driver blade 26, 1026, eventually stopping the piston 22, 1022 in the driven or BDC position.

Shortly after the driver blade 26, 1026 reaches the BDC position, a first of the drive pins 1276 on the lifter 44, 1044 engages one of the lifting teeth 26*a*, 1026*a* on the driver blade 26, 1026 and continued counter-clockwise rotation of the lifter 44, 1044 raises the driver blade 26, 1026 and the piston 22, 1022 toward the ready position. Shortly thereafter and prior to the lifter 44, 1044 making one complete rotation, the solenoid is de-energized, permitting the latch 1354 to re-engage the driver blade 26, 1026 and ratchet around the latching teeth 26*b*, 1026*b* as upward displacement of the driver blade 26, 1026 continues (defining the latched state of the latch assembly).

After one complete rotation of the lifter 44, 1044 occurs, the latch 1354 maintains the driver blade 26, 1026 in an intermediate position between the BDC position and the TDC position while the lifter 44, 1044 continues counter-clockwise rotation (from the frame of reference of FIG. 6) until the first drive pin 1276' re-engages another of the lifting teeth 26*a*, 1026*a* on the driver blade 26, 1026. Continued rotation of the lifter 44, 1044 raises the driver blade 26, 1026 to the TDC position.

With reference to FIGS. 1-3, in some embodiments, the driver 10 further includes a nosepiece assembly 400 positioned at an end of the magazine 14. The magazine 14 includes a magazine body 404 configured to receive the fasteners to be driven into the workpiece by the powered fastener driver. The magazine body 404 (FIG. 1) has a first end 408 and a second end 412 opposite the first end 408. The magazine body 404 defines a fastener channel (not shown) extending from the first end 408 to proximate the second end 412 of the magazine body 404. The fastener channel is configured to receive the fasteners. The magazine 14 further includes a pusher assembly 480 positioned within the fastener channel 448 of the magazine body 404. The pusher assembly 480 is slidably coupled to the magazine 14 and configured to bias the fasteners in the magazine 14 toward the nosepiece assembly 400. With reference to FIGS. 1-2, the nosepiece assembly 400 is positioned at the first end 408 of the magazine body 404. The nosepiece assembly 400 generally includes a first, base portion 510 coupled to the first end 408 of the magazine body 404 and a second, cover portion 514 coupled to the base portion 510. The base portion 510 of the nosepiece assembly 400 is fixed to the magazine body 404. The cover portion 514 of the nosepiece assembly 400 substantially covers the base portion 510. In the illustrated embodiment, the cover portion 514 is pivotally coupled to the base portion 510 by a latch mechanism 518. The nosepiece assembly 400 cooperatively defines a firing channel 522 (only a portion of which is shown in FIG. 6) extending along the driving axis 38. The firing channel 522 is in communication with the fastener channel 448 of the magazine body 404 (e.g., by an opening 526 in the base portion 510) for receiving a fastener from the magazine body 404. The nosepiece assembly 400 further has a distal end 530 at one end of the firing channel 522. The driver blade 26 is received in the firing channel 522 for driving the fastener from the firing channel 522, out the distal end 530 of the nosepiece assembly 400, and into a workpiece, as discussed above. The fastener driver 1010 may also include the nosepiece assembly 400.

With reference to FIGS. 1-3, in some embodiments, the driver 10 includes a workpiece contact assembly 540 extending along one side of the nosepiece assembly 400. The workpiece contact assembly 540 is configured to be moved from the extended position toward a retracted position when the workpiece contact assembly 540 is pressed against a workpiece. The length from the first end 54*b*, 1054*b* of the storage chamber cylinder 30, 1030 to the end of the workpiece contact assembly 540 is less than 6.9 inches (i.e., 175.5 mm). In particular, the length is 6.88 inches (i.e., 175 mm). The workpiece contact assembly 540 includes a depth of drive adjustment mechanism 600, which adjusts the effective length of the workpiece contact assembly 540. The depth of drive adjustment mechanism 600 adjusts the depth to which a fastener is driven into the workpiece. Although not shown, the powered fastener driver 10 further includes a dry-fire lockout assembly. The dry-fire lockout assembly prevents the powered fastener driver 10 from operating when the number of fasteners remaining in the magazine 14 drops below a predetermined value. The fastener driver 1010 may also include the workpiece contact assembly 540 and the drive adjustment mechanism 600.

The kinetic energy of the fastener driver 10, 1010 is 101.3 Joules.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:

a housing;

an inner cylinder within the housing;

a piston movable within the inner cylinder from a top-dead-center (TDC) position to a driven or bottom-dead-center (BDC) position, the piston having a diameter of less than or equal to 1.5 inches, and a stroke length of the piston between the TDC position and the BDC position measuring greater than 3 inches;

a driver blade attached to the piston for movement therewith along a driving axis from the TDC position toward the BDC position for driving a fastener into a workpiece;

a lifter operable to move the piston and driver blade from the BDC position toward the TDC position; and a drive unit operably coupled to the lifter to provide torque thereto, causing the lifter to rotate, and a source of pressurized gas in fluid communication with the inner cylinder, wherein a pressure of the pressurized gas acting on the piston at the TDC position is at least 236 psi.

2. The powered fastener driver of claim 1, further comprising an outer storage chamber cylinder positioned within the housing and including the pressurized gas in fluid communication with the inner cylinder.

3. The powered fastener driver of claim 2, wherein the inner cylinder includes a first end, second end opposite a first end, and an engagement interface extending from an outer surface of the inner cylinder and positioned between the first end and the second end, the engagement interface configured to seal with an engagement interface on an inner surface of the outer storage chamber cylinder.

4. The powered fastener driver of claim 3, wherein the engagement interface of the inner cylinder and the engagement interface of the outer storage chamber cylinder are threaded interfaces.

5. The powered fastener driver of claim 1, further comprising a bumper positioned within the inner cylinder and configured to stop the piston and driver blade at the BDC position, the bumper having a length that is greater than about 20% of a length of the inner cylinder.

6. The powered fastener driver of claim 5, wherein the bumper has a first end, a second end opposite the first end, a first portion positioned adjacent the first end, a second portion positioned adjacent the second end, and a neck positioned between the first portion and the second portion, the first portion being narrower than the second portion, the first portion having an outer diameter of less than 1.7 inches.

7. The powered fastener driver of claim 1, wherein the piston includes a circumferential groove, wherein a seal ring is positioned within the circumferential groove, and wherein the seal ring has a thickness of at least 0.2 inches.

8. The powered fastener driver of claim 7, wherein the seal ring is a quad ring.

9. A powered fastener driver comprising:

a housing;

an inner cylinder within the housing, the inner cylinder including a first end, a second end opposite the first end, and an engagement interface on an outer surface thereof, the engagement interface positioned between the first end and the second end of the inner cylinder;

a piston movable within the inner cylinder from a top-dead-center (TDC) position to a driven or bottom-dead-center (BDC) position, the piston having a diameter of less than or equal to 1.5 inches, and a stroke length of the piston between the TDC position and the BDC position measuring greater than 3 inches;

a driver blade attached to the piston for movement therewith along a driving axis from the TDC position toward the BDC position for driving a fastener into a workpiece;

a lifter operable to move the piston and driver blade from the BDC position toward the TDC position;

a drive unit operably coupled to the lifter to provide torque thereto, causing the lifter to rotate;

a storage chamber cylinder positioned within the housing and including a pressurized gas in fluid communication with the inner cylinder, the storage chamber cylinder including a first end and a second end opposite the first end, the second end having an inner surface with an engagement interface, the first end of the inner cylinder positioned within the storage chamber cylinder and the second end of the inner cylinder spaced apart from the second end of the storage chamber cylinder, the inner cylinder coupled to the storage chamber cylinder via mating engagement between the engagement interface of the inner cylinder and the engagement interface of the storage chamber cylinder; and a seal ring between the outer surface of the inner cylinder and the inner surface of the storage chamber cylinder at a location between the engaged engagement interfaces and the second end of the storage chamber cylinder, wherein a pressure of the pressurized gas acting on the piston at the TDC position is at least 236 psi.

10. The powered fastener driver of claim 9, wherein the seal ring has a cuboidal cross-section.

11. The powered fastener driver of claim 9, wherein the engagement interface of the inner cylinder and the engagement interface of the storage chamber cylinder are threaded interfaces.

12. The powered fastener driver of claim 9, further comprising a bumper positioned within the inner cylinder and configured to stop the piston and driver blade at the BDC position, the bumper having a length that is greater than about 20% of a length of the inner cylinder.

13. The powered fastener driver of claim 12, wherein the bumper has a first end, a second end opposite the first end, a first portion positioned adjacent the first end, a second portion positioned adjacent the second end, and a neck positioned between the first portion and the second portion, the first portion being narrower than the second portion, the first portion having an outer diameter of less than 1.7 inches.

14. A powered fastener driver comprising:

a housing;

an inner cylinder within the housing, the inner cylinder including a first end and a second end opposite the first end;

a piston movable within the inner cylinder from a top-dead-center (TDC) position to a driven or bottom-dead-center (BDC) position, the piston having a diameter of less than or equal to 1.5 inches, and a stroke length of the piston between the TDC position and the BDC position measuring greater than 3 inches;

a driver blade attached to the piston for movement therewith along a driving axis from the TDC position toward the BDC position for driving a fastener into a workpiece;

a lifter operable to move the piston and driver blade from the BDC position toward the TDC position;

a drive unit operably coupled to the lifter to provide torque thereto, causing the lifter to rotate; and a storage chamber cylinder positioned within the housing, the storage chamber cylinder including a pressurized gas in fluid communication with the inner cylinder and an annular wall that extends between a first end and a second end opposite the first end, wherein the annular wall gradually tapers radially inward from the first end to the second end, wherein the inner cylinder is positioned within the storage chamber cylinder and the second end of the inner cylinder contacts the annular wall of the storage chamber cylinder at an engagement interface;

wherein a pressure of the pressurized gas acting on the piston at the TDC position is at least 236 psi.

15. The powered fastener driver of claim 14, further comprising a bumper positioned within the inner cylinder and configured to stop the piston and driver blade at the BDC position, the bumper having a length that is greater than about 20% of a length of the inner cylinder.

16. The powered fastener driver of claim 15, wherein the bumper has a first end, a second end opposite the first end, a first portion positioned adjacent the first end, a second portion positioned adjacent the second end, and a neck positioned between the first portion and the second portion, the first portion being narrower than the second portion, the first portion having an outer diameter of less than 1.7 inches.

17. The powered fastener driver of claim 14, wherein the piston includes a circumferential groove, wherein a seal ring is positioned within the circumferential groove, and wherein the seal ring has a thickness of at least 0.2 inches.

18. The powered fastener driver of claim 17, wherein the seal ring is a quad ring.

19. The powered fastener driver of claim 14, wherein the stroke length is 4.6 inches.

20. The powered fastener driver of claim 14, wherein the inner cylinder is trapped within the storage chamber cylinder, such that the first end of the inner cylinder is in contact with the first end of the storage chamber cylinder and the second end of the inner cylinder is in contact with the second end of the storage chamber cylinder.

* * * * *